(12) United States Patent
Gadbois et al.

(10) Patent No.: US 9,418,684 B2
(45) Date of Patent: Aug. 16, 2016

(54) MAGNETIC READ HEAD WITH SEPARATELY ADDRESSABLE READ TRANSDUCERS

(71) Applicant: Seagate Technology LLC, Cupertino, CA (US)

(72) Inventors: Jason Bryce Gadbois, Shakopee, MN (US); Steven A. Mastain, Spring Park, MN (US); James K. Price, Excelsior, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/046,487

(22) Filed: Oct. 4, 2013

(65) Prior Publication Data

US 2015/0098151 A1   Apr. 9, 2015

(51) Int. Cl.
| | | |
|---|---|---|
| *G11B 5/127* | (2006.01) | |
| *G11B 5/29* | (2006.01) | |
| *G11B 5/48* | (2006.01) | |
| *G11B 5/39* | (2006.01) | |
| *G11B 5/49* | (2006.01) | |

(52) U.S. Cl.
CPC *G11B 5/29* (2013.01); *G11B 5/295* (2013.01); *G11B 5/3948* (2013.01); *G11B 5/4853* (2013.01); *G11B 5/4886* (2013.01); *G11B 5/4976* (2013.01); *Y10T 29/49048* (2015.01)

(58) Field of Classification Search
CPC ........ G11B 5/29; G11B 5/4853; G11B 5/295; G11B 5/4976; G11B 5/3948; G11B 5/4886; G11B 5/584; G11B 2005/3996; G11B 5/1278; G11B 5/3903; G11B 5/3932; G11B 5/3912; G11B 5/00813; Y10T 29/49048

USPC .................................................... 360/316, 121
See application file for complete search history.

(56) References Cited

U.S. PATENT DOCUMENTS

| | | | | |
|---|---|---|---|---|
| 4,261,024 | A | * | 4/1981 | Desserre ................ G11B 21/20 360/234.6 |
| 4,523,243 | A | * | 6/1985 | Billington ............ G11B 5/3103 235/449 |
| 4,673,999 | A | * | 6/1987 | Suyama et al. .......... 360/125.33 |
| 4,912,585 | A | * | 3/1990 | Belser .................... B82Y 10/00 360/131 |
| 5,027,245 | A | * | 6/1991 | Nagata et al. ................. 360/121 |
| 5,065,500 | A | * | 11/1991 | Yoneda et al. ............. 29/603.12 |
| 5,079,831 | A | | 1/1992 | Reid |
| 5,128,821 | A | * | 7/1992 | Takeuchi ............. G11B 5/6005 360/236.8 |
| 5,153,980 | A | * | 10/1992 | Kira ........................... 29/603.14 |
| 5,212,611 | A | * | 5/1993 | Dee .............................. 360/316 |
| 5,251,088 | A | * | 10/1993 | Coutellier .............. G11B 5/332 360/316 |
| 5,345,341 | A | * | 9/1994 | Durland .......................... 360/15 |
| 5,508,868 | A | | 4/1996 | Cheng et al. |
| 5,541,793 | A | * | 7/1996 | Schwarz ........................ 360/121 |
| 6,014,291 | A | * | 1/2000 | Watanabe et al. ............. 360/121 |
| 6,061,196 | A | * | 5/2000 | Kalfs ................... G11B 5/4893 360/48 |
| 6,271,998 | B1 | | 8/2001 | Coehoorn et al. |
| 6,477,009 | B1 | * | 11/2002 | Watson et al. ................ 360/128 |

(Continued)

*Primary Examiner* — Brian Miller
(74) *Attorney, Agent, or Firm* — Hollingsworth Davis, LLC (57) ABSTRACT

A read head with at least two separately addressable read transducers that are coplanar in a cross track direction. The read transducers have a cross track width, $w_r$, and a center-to-center separation distance between the two read transducers either greater than $3w_r$ or the distance of two tracks of an associated medium in the cross track direction.

19 Claims, 9 Drawing Sheets

(56) References Cited

U.S. PATENT DOCUMENTS

| | | | |
|---|---|---|---|
| 6,646,830 B2* | 11/2003 | Biskeborn et al. | 360/129 |
| 6,785,099 B2 | 8/2004 | Lee et al. | |
| 6,807,032 B1 | 10/2004 | Seigler et al. | |
| 6,819,528 B1* | 11/2004 | Cates et al. | 360/241.1 |
| 6,842,312 B1 | 1/2005 | Alstrin et al. | |
| 7,382,569 B2* | 6/2008 | Biskeborn | G11B 5/00826 360/121 |
| 7,405,907 B2* | 7/2008 | Raastad | 360/315 |
| 7,551,393 B2* | 6/2009 | Biskeborn et al. | 360/121 |
| 7,760,465 B2* | 7/2010 | Koeppe | 360/121 |
| 8,000,048 B2* | 8/2011 | Wilson | B82Y 10/00 360/48 |
| 8,208,228 B2 | 6/2012 | Maat et al. | |
| 8,248,727 B2* | 8/2012 | Biskeborn et al. | 360/121 |
| 8,411,392 B2* | 4/2013 | van de Veerdonk | B82Y 10/00 360/110 |
| 8,711,517 B2* | 4/2014 | Erden et al. | 360/121 |
| 8,730,615 B1* | 5/2014 | Poorman | 360/121 |
| 2002/0071198 A1* | 6/2002 | Liu et al. | 360/77.02 |
| 2005/0041317 A1* | 2/2005 | Jaquette | G11B 5/00813 360/46 |
| 2006/0050433 A1* | 3/2006 | Lee et al. | 360/126 |
| 2007/0109682 A1* | 5/2007 | Ozue | G11B 5/534 360/125.39 |
| 2011/0149437 A1* | 6/2011 | Kashiwagi | B82Y 10/00 360/110 |
| 2012/0206830 A1* | 8/2012 | Gao | B82Y 10/00 360/61 |

\* cited by examiner

US 9,418,684 B2

MAGNETIC READ HEAD WITH SEPARATELY ADDRESSABLE READ TRANSDUCERS

SUMMARY

Some embodiments are directed to devices, methods and systems that can be used with magnetic data storage systems.

In one embodiment, the device comprises a magnetic read head with at least two separately addressable transducers that are substantially coplanar in a cross track direction. The transducers have a cross track width, $w_r$, and a center-to-center separation distance between the at least two transducers greater than or equal to about $3w_r$ in the cross track direction.

In another embodiment, a system includes a magnetic medium having data tracks each data track having a width, $w_r$, and a magnetic read head having at least two separately addressable read transducers that are coplanar in a cross track direction and have a center-to-center separation distance between the read transducers of at least $2w_r$.

In another embodiment, a method includes forming first and second coplanar read transducers over at least one bottom electrical contact, depositing a first top electrical contact over the first read transducer, depositing an electrical insulator conformally over the first top electrical contact, removing the electrical insulator from the second read transducer, depositing a second top electrical contact over the electrical insulator such that the first and second top electrical contacts are electrically separated from each other by the electrical insulator, and planarizing the second top electrical contact and the electrical insulator to form separately addressable first and second electrical contacts.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates generally to the field of magnetic data storage systems. In particular, the present disclosure relates to a magnetic read head with multiple read transducers. Multiple read transducers disposed on the same physical plane in close proximity (such as on adjacent read tracks) offer the potential for increased read data rates and process and design simplification. However, placing the read transducers in such an arrangement creates design and process difficulties due to skew sensitivity and wafer process cost. In particular, the close proximity of the read transducers leaves little room for edge domain stabilization along their shared gap. Additionally, at least one of the hybrid shield/contact layers must be split along an edge to allow for independent electrical contacts to the readers. The gap created by the split must be precisely aligned with the gap between the read transducers and results in a configuration where the read transducers are placed close to an edge of the shield. Such a configuration creates the potential for degradation in reader resolution due to reduced shielding effectiveness as well as creates a source of shield induced instability.

The present disclosure addresses these concerns by disposing the read transducers in a coplanar cross track arrangement at a sufficient distance (e.g., two or more track widths apart in a cross track direction) from one another. Such an arrangement disposes the shield edge and gap away from the edges of the read transducers and allows for a greater degree of misalignment. In additional embodiments, the multiple read transducers include first and second electrical contacts that are configured to also serve as magnetic shields to provide both electrical connectivity and magnetic shielding. The electrical contacts are coplanar and electrically isolated from one another. As used herein, coplanar means that a center-to-center distance between the read transducers (or other components) in the thickness (downtrack) direction is less than the thickness of either of the read transducers.

Embodiments disclosed herein involve a magnetic read head that includes at least two separately addressable read transducers that are coplanar in a cross track direction. The read transducers have a cross track width, $w_r$, and a center-to-center separation distance between the two read transducers greater than $3w_r$ in the cross track direction.

Figure 1:
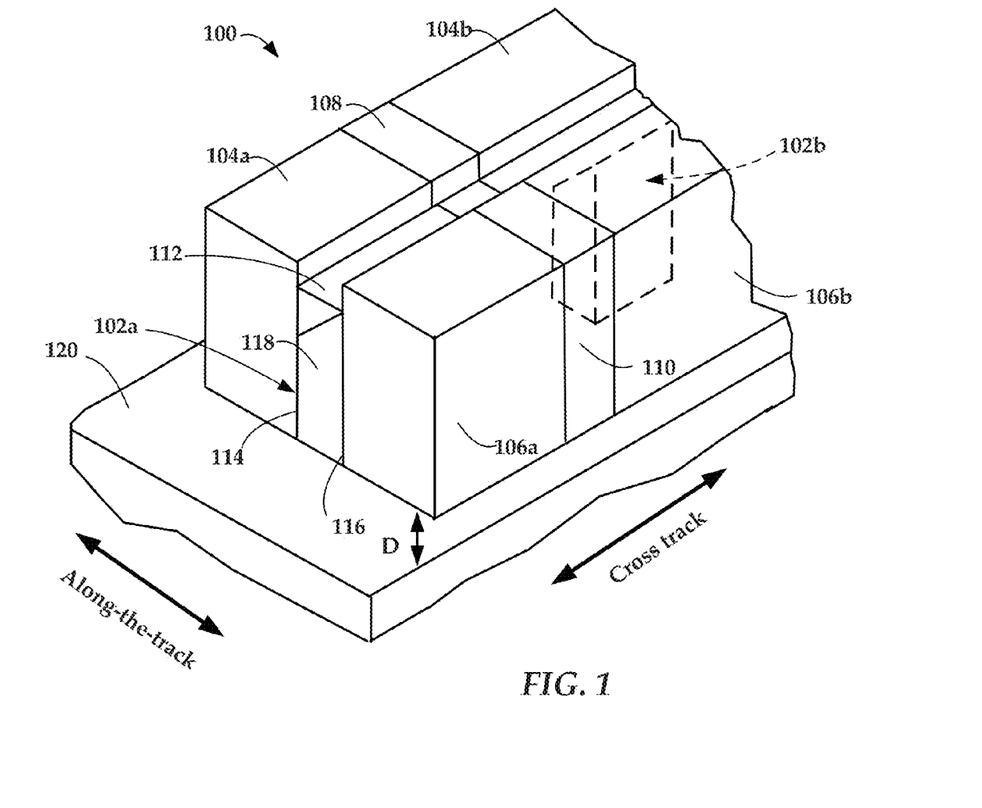
FIG. 1 is a partially sectioned perspective view of a magnetic read head and shields/electrical contacts according to one exemplary embodiment.
Figure 1A:
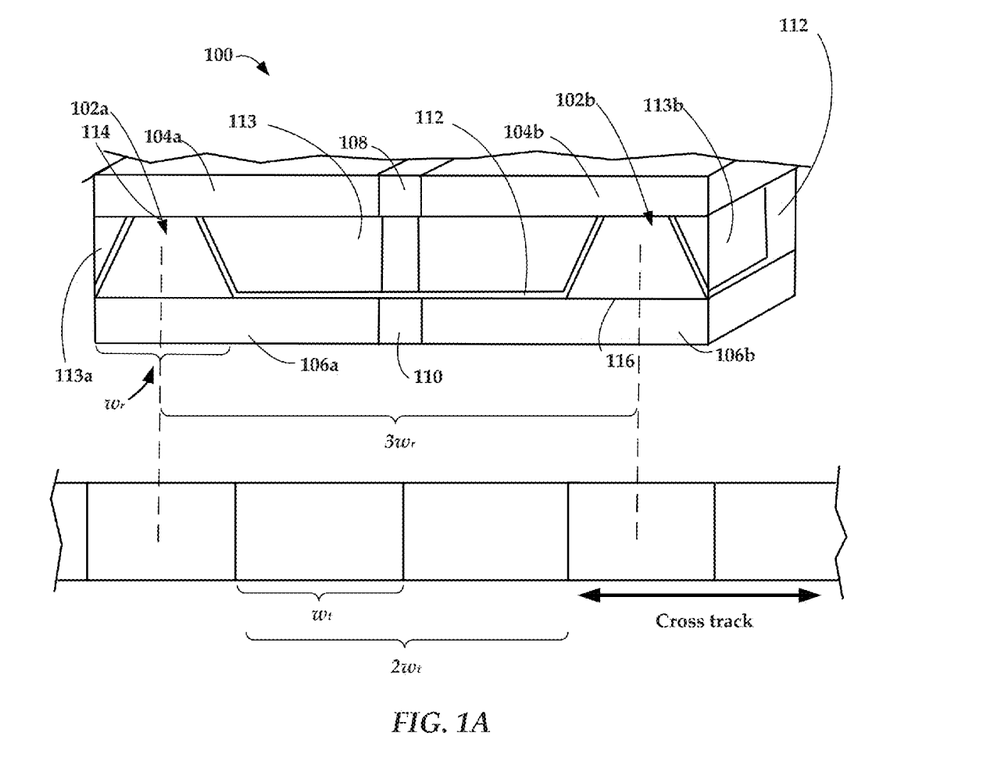
FIG. 1A is a second perspective view of the magnetic read head of FIG. 1.

FIG. 1 shows a perspective view a magnetic read head 100 with first and second read transducers 102a and 102b (shown in phantom in FIG. 1) according to an exemplary embodiment. In FIG. 1, the first transducer 102a (along with a first top contacts 104a and a first bottom contact 106a) are sectioned. The magnetic read head 100 of FIG. 1 additionally includes first and second top contacts 104a and 104b, first and second bottom contacts 106a and 106b, and insulating material 108, 110, and 112. FIG. 1A is a perspective view of the magnetic read head 100 viewed from adjacent an ABS additionally showing magnetic stabilization elements 113, 113a, and 113b.

The first read transducer 102a is disposed between the first top contact 104a and the first bottom contact 106a. Similarly, the second read transducer 102b is disposed between the second top contact 104b and the second bottom contact 106b. The insulating material 108 separates the first top contact 104a from the second top contact 104b. Similarly, the insulating material 110 separates the first bottom contact 106a from the second bottom contact 106b. Insulating material 112 is disposed along a non-ABS interfacing side of the first and second read transducers 102a and 102b. In one embodiment, insulating material 108, 110, and 112 can comprise at least one of an alumina and/or silicon dioxide.

Referring to FIG. 1A, the magnetic stabilization element 113 is disposed between the first and second read transducers 102a and 102b and is coplanar therewith. Similarly, the magnetic stabilization elements 113a and 113b are disposed to either side of the first and second read transducers 102a and 102b in the cross track direction. In some embodiments, the magnetic stabilization elements 113, 113a and 113b comprise permanent magnets. In other embodiments, the magnetic stabilization elements 113, 113a and 113b can comprise magnetic shields.

As shown in the embodiment of FIG. 1, each read transducer 102a and 102b is located adjacent an air bearing surface (ABS) 120 and has a first surface 114 and a second surface 116 (only one of each is shown in FIG. 1) that adjoin the ABS 120 along the cross track direction. Additionally, stabilization elements 113a and 113b (FIG. 1A) can be used on the outer edges of each of the first and second read transducers 102a and 102b. The first top contact 104a is disposed along the first surface 114 of the read transducer 102a and the first bottom contact 106a is disposed along the second surface 116 of the read transducer 102a. In FIG. 1, the first top contact 104a is coplanar with and electrically isolated from the second top contact 104b. Similarly, the first bottom contact 106a is coplanar with and electrically isolated from the second bottom contact 106b. In the embodiment of FIG. 1, the first top contact 104a, the second top contact 104b, the first bottom contact 106a, and the second bottom contact 106b are combined electrical contacts as well as shields and are configured to provide both electrical connectivity and magnetic shielding.

The first read transducer 102a extends between the first top contact 104a and the second bottom contact 106a generally in the along-the-track direction in the embodiment of FIG. 1. Similarly, the second read transducer 102b extends between the second top contact 104b and the second bottom contact 106b generally in the along-the-track direction. The first and second top contacts 104a and 104b extend generally in the cross track direction and together form electrically continuous contacts disposed along the first surfaces 114 of both the first read transducer 102a and the second read transducer 102b. The first and second bottom contacts 106a and 106b extend generally in the cross track direction and together form electrically continuous contacts disposed along the second surfaces 116 of both the first read transducer 102a and the second read transducer 102b.

Contacts 104a, 104b, 106a and 106b can be made with magnetically permeable materials, such as nickel, iron, cobalt, or combinations thereof. For example, one material, commonly known as permalloy, consisting of $Ni_{80}Fe_{20}$ can be used in some embodiments. In other embodiments, $Ni_{90}Fe_{10}$ or $Ni_{70}Fe_{30}$ can be used. Additionally, any material that reduces anisotropic magnetoresistance (AMR) effect and is usable for a combination contact/shield can be used. Examples of such materials include Cu, Cr, Mn, Ti, Au, Ag, V, Zr, Nb, Ta, and W.

In one embodiment, the first and second read transducers 102a and 102b utilize read elements 118 that can comprise, for example, a giant magneto-resistive (GMR) read element, a spin valve, or any other type of read element, such as a tunnel magneto-resistive (TMR) read element. The stabilization elements 113a and 113b, located adjacent the read elements 118, may be either a permanent magnet or permeable side shield material in some embodiments.

As shown in FIG. 1, a magnetic storage medium such as a magnetic disk can be used with the magnetic read head 100 in some applications. The magnetic read head 100 can be spaced an appropriate distance D from the medium. The medium can include recording layers and may have distinct or continuous magnetically permeable tracks divided into sectors in the cross track direction.

During operation, the medium is passed under the magnetic read head 100 so that the tracks pass under the first and second read transducers 102a and 102b. The sector of the track directly under each of the first and second read transducers 102a and 102b will be read. In some embodiments, the first transducer 102a and the second transducer 102b can each be selectively activated. For example, the first transducer 102a can be active at a time when the second transducer 102b would be inactive. Thus, in some embodiments, the second transducer 102b could be a spare that could be switched on in the event of a failure of the first transducer 102a.

FIG. 1A shows the magnetic read head 100 of FIG. 1 from a different perspective along several surfaces that interface with the ABS. Thus, FIG. 1A shows the first and second read transducers 102a and 102b, the first and second top contacts 104a and 104b, the first and second bottom contacts 106a and 106b, the insulating materials 108 and 110, the magnetic stabilization elements 113, 113a and 113b, the first surfaces 114 and the second surfaces 116.

In the exemplary embodiment of FIG. 1A, the first and second read transducers 102a and 102b are separately addressable read transducers that are coplanar in a cross track direction with one another. The first and second read transducers 102a and 102b have a cross track width, $w_r$, and a center-to-center separation distance between the at least two read transducers greater than $3w_r$ in the cross track direction. This separation distance can be greater than about 100 nm in some embodiments. In other embodiments, the separation distance is at least 1 µm. In further embodiments, where the first and second read transducers 102a and 102b are configured for operation with a magnetic medium, the separation distance is at least two track widths of the medium.

Additionally, the embodiment of FIG. 1A shows that in some cases a shield-to-shield spacing between the top electrical contacts 104a and 104b disposed along the first surfaces 114 of the read transducers 102a and 102b and the bottom electrical contacts 106a and 106b disposed along the second surfaces 116 of the read transducers is less than about 25 nm. In some embodiments, the magnetic stabilization elements 113, 113a and 113b have a width along the cross track direction greater than about 25 nm.

Figure 2:
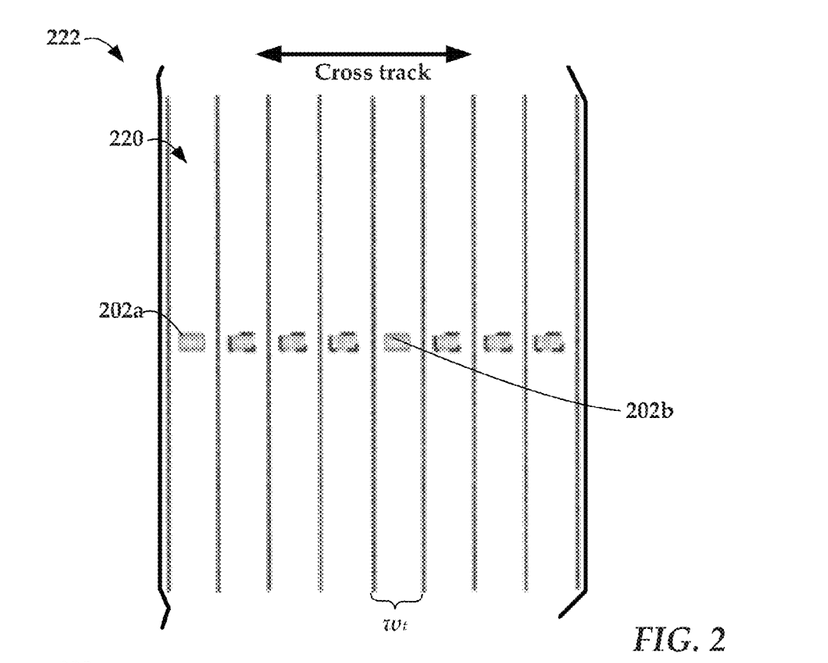
FIG. 2 is a schematic view of read transducers disposed along data tracks of a magnetic medium according to one exemplary embodiment.

FIG. 2 illustrates one embodiment of a possible arrangement of read transducers 202a and 202b along data tracks 220 of magnetic medium 222 for use with embodiments of the magnetic read head disclosed herein. In FIG. 2, some potential additional locations of the read transducers 202a and 202b are shown in phantom.

As shown in the embodiment of FIG. 2, the magnetic medium 222 has data tracks 220, each data track has a width, $w_t$, and the magnetic read head has at least two separately addressable read transducers 202a and 202b. The read transducers 202a and 202b are coplanar in the cross track direction and are configured for operation with the magnetic medium 222. In the illustrated embodiment, a center-to-center separation distance between the read transducers is at least $2w_r$. In the embodiment of FIG. 2, the track width $w_t$ is configured such that an integer number of tracks 220 exist in the space between the center-to-center separation distance between of the read transducers 202a and 202b. Although distinct tracks are shown, in some embodiments, the magnetic medium 222 is a continuous magnetic medium disk such that has no bit patterned media or discrete track media exists.

Figure 3:
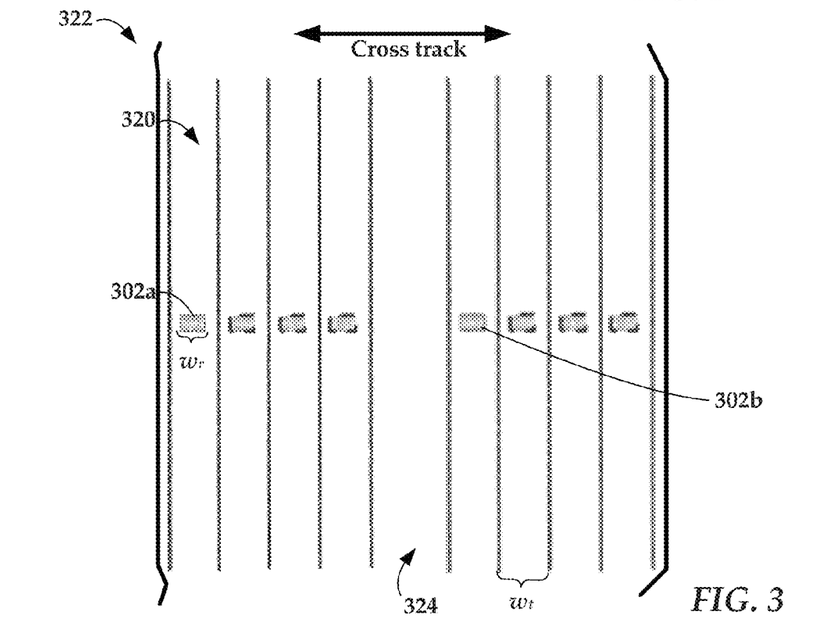
FIG. 3 is a schematic view of read transducers disposed along data tracks of a magnetic medium according to another exemplary embodiment.

FIG. 3 illustrates another embodiment of a possible arrangement of read transducers 302a and 302b along data tracks 320 of magnetic medium 322 for use with embodiments of the magnetic read head disclosed herein. In FIG. 3, some potential additional locations of the read transducers 302a and 302b are shown in phantom.

Figure 3A:
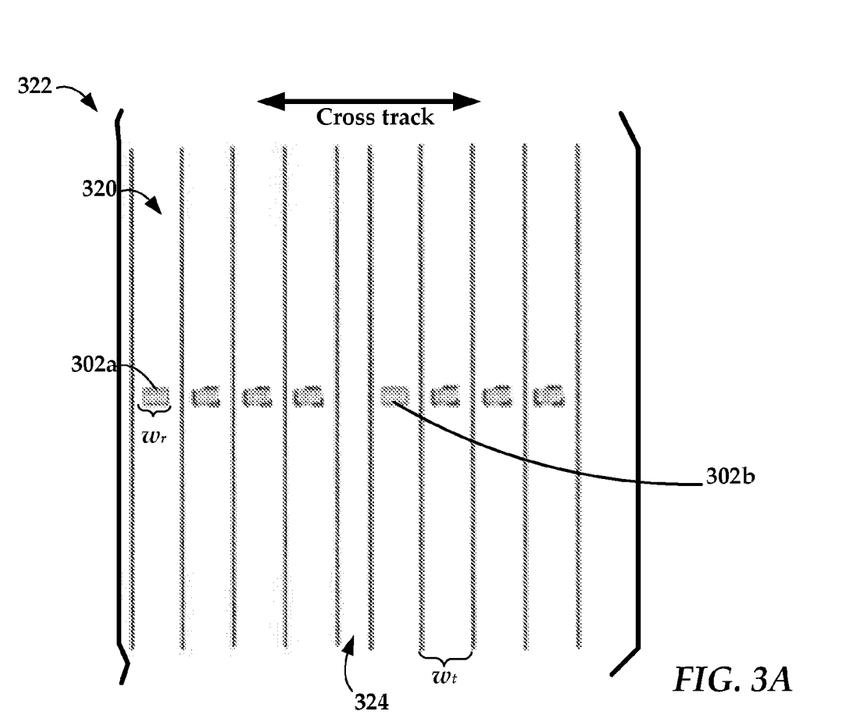
FIG. 3A is a schematic view of read transducers disposed along data tracks of a magnetic medium according to a further exemplary embodiment.

In FIG. 3, the magnetic medium 322 includes one or more non-data tracks 324 disposed between bands of data tracks 320. Thus, the center-to-center spacing between the data tracks is a non-integer multiple of the separation distance between read transducers 302a and 302b. In the embodiment of FIG. 3, each non-data track 324 has a width greater than the track width $w_t$. However, in other embodiments, each non-data track 324 can have a width less than the track width $w_t$ (see, e.g. FIG. 3A).

As shown in FIG. 3, read transducers 302a and 302b have a cross track width, $w_r$, and the separation distance is greater than about $3w_r$. In some embodiments, the separation distance is greater than about 100 nm. In yet other embodiments, the separation distance is at least 1 μm. In yet further embodiments, the separation distance is at least $25w_r$.

Figure 4:
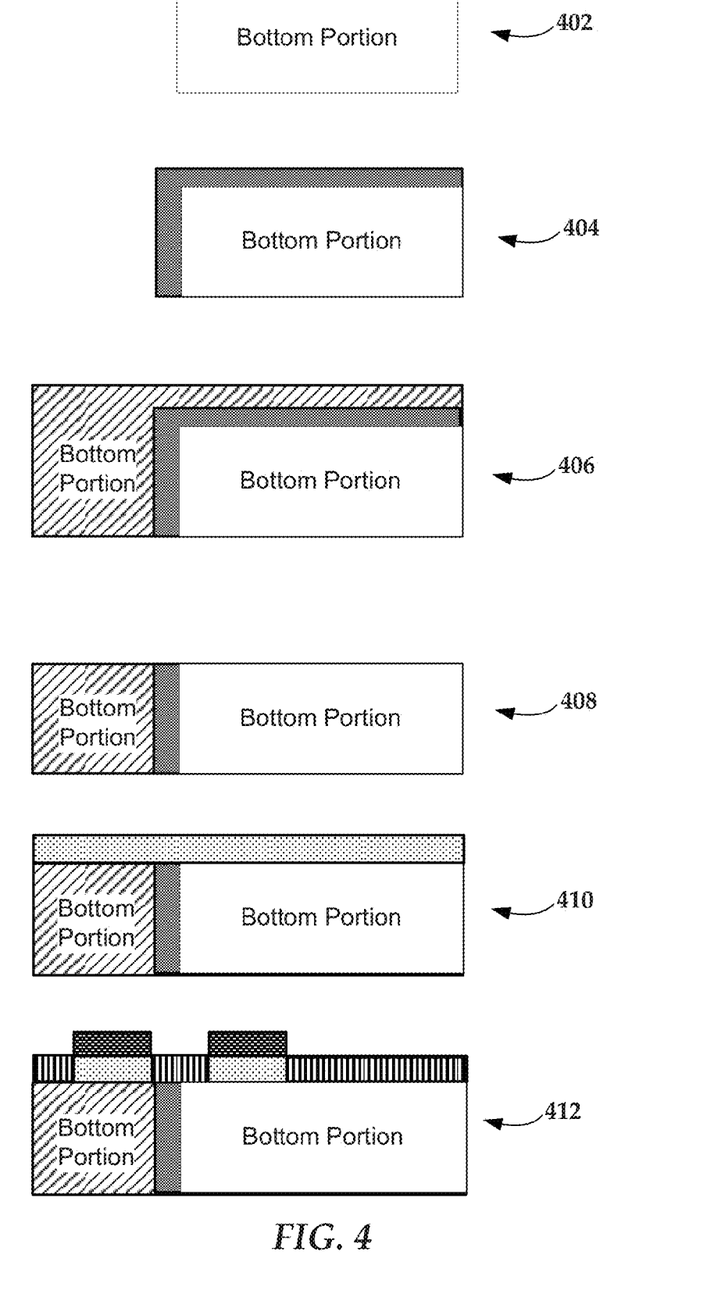
FIGS. 4, 4A, and 4B illustrate one method of fabricating a magnetic read head.
Figure 4A:
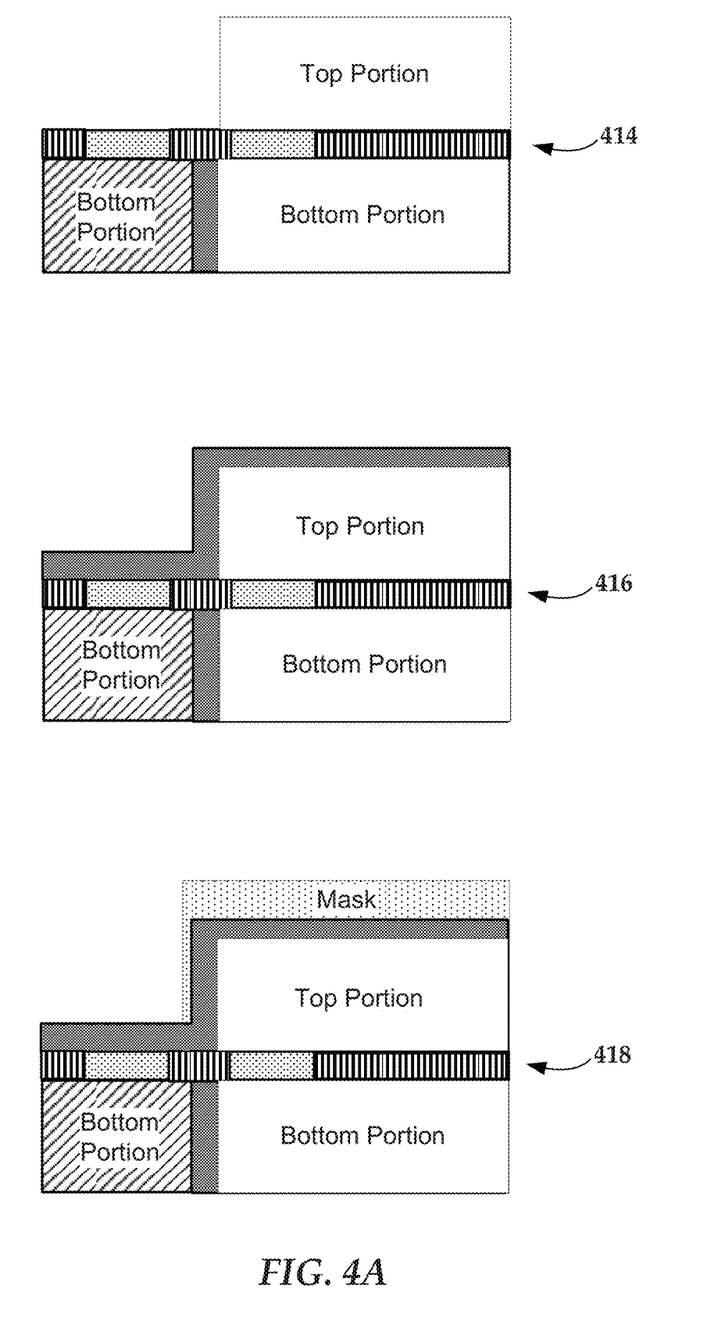
Figure 4B:
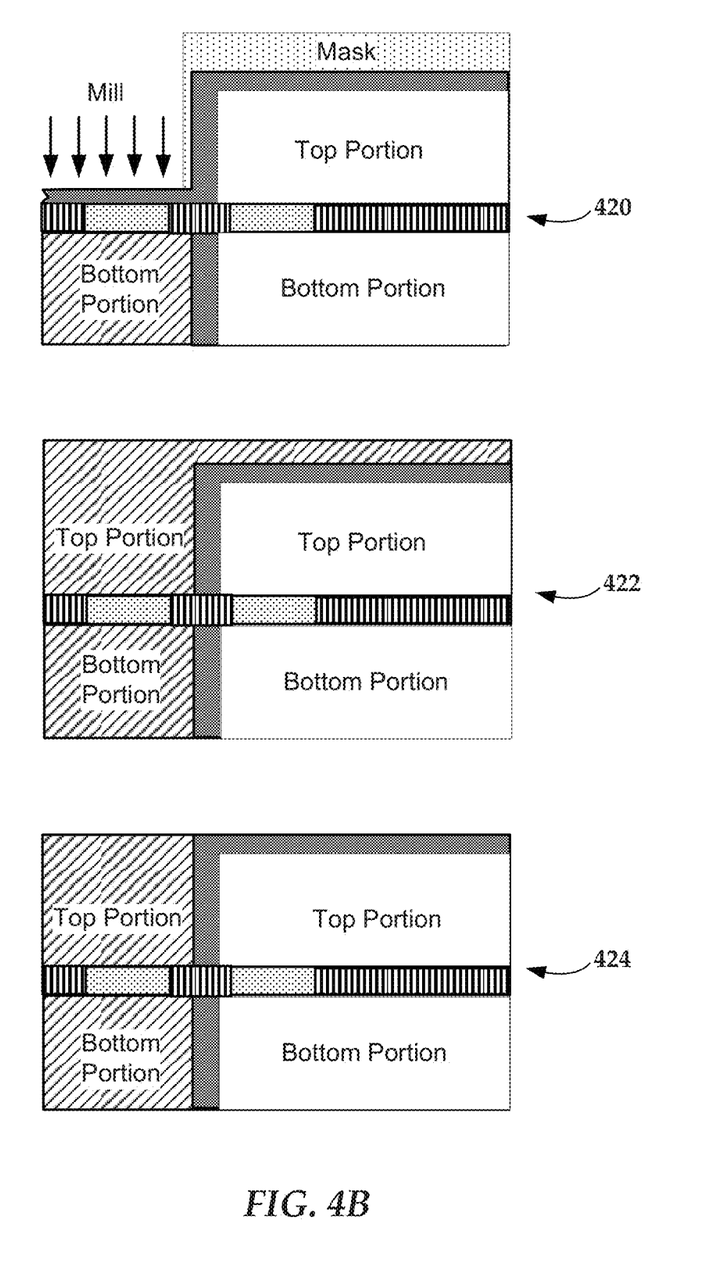

FIGS. 4, 4A, and 4B illustrate a method of forming a magnetic read head according to an exemplary embodiment. In step 402, a first bottom half of an electrical contact is initially deposited. An electrically insulating layer is deposited on one or more surfaces, such as a surface and an edge, of the first bottom half of the electrical contact in step 404. A second bottom half of the electrical contact is deposited over the electrical insulator and the first bottom half in step 406. The method proceeds from step 406 to step 408, where second bottom half of the electrical contact, the electrical insulator, and the first bottom half of the electrical contact are planarized. In step 410, first and second coplanar read transducers are formed by, for example, deposition on planarized bottom half of the electrical contact, the electrical insulator, and the first bottom half of the electrical contact. Additional forming steps can be performed at steps 412 to 420, including, for example, depositing an additional insulating layer, masking, patterning, and milling as desired. For example, in step 418, the second top electrical contact is masked and the electrical insulator is removed from the second read transducer in step 420. In steps 422 and 424, the process is repeated with respect to the first and second halves of the top electrical contact to complete magnetic read head.

Figure 5:
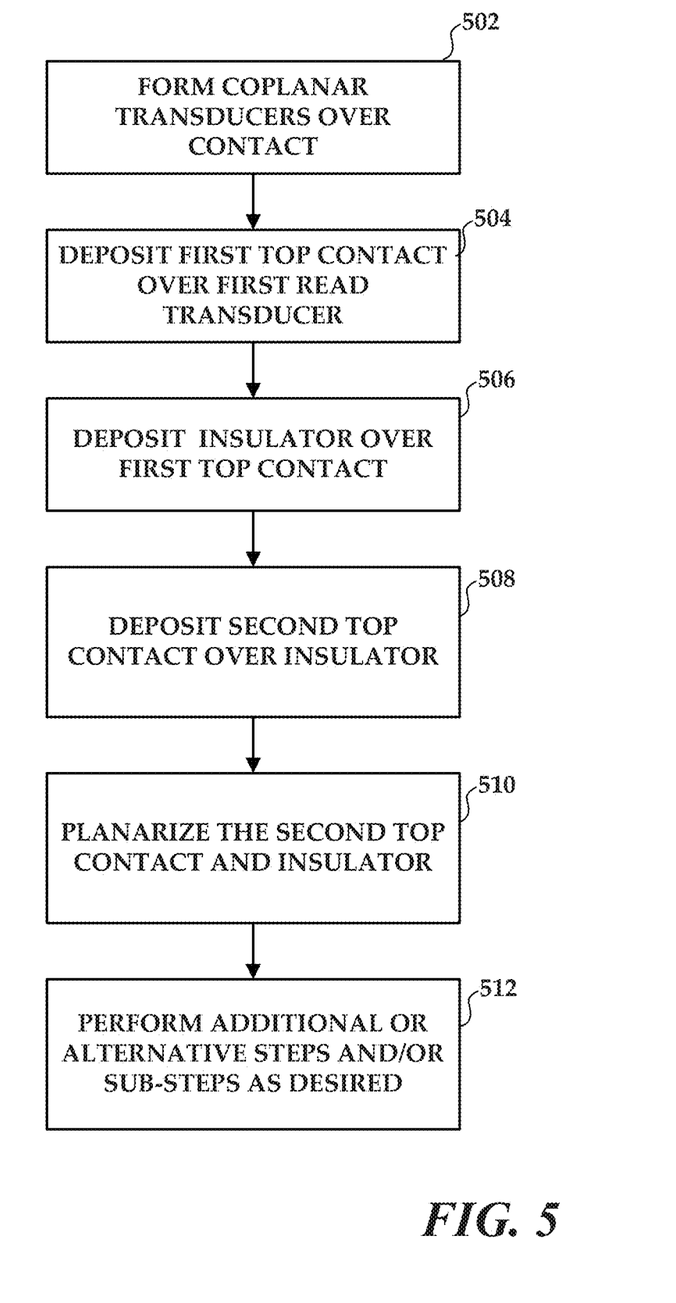
FIG. 5 is a flow diagram of another method of fabricating a magnetic read head.

FIG. 5 shows a flow diagram of another method of forming a magnetic read head. The method includes a step 502 where first and second coplanar read transducers are formed over at least one bottom electrical contact. In step 504, a first top electrical contact is deposited over the first read transducer. The method proceeds from step 504 to step 506 where an electrical insulator is deposited conformally over the first top electrical contact. Also in step 506, the second top electrical contact is masked and the electrical insulator is removed from the second read transducer. In step 508, a second top electrical contact is deposited over the electrical insulator such that the first and second top electrical contacts are electrically separated from each other by the electrical insulator. The second top electrical contact and the electrical insulator are planarized to form separately addressable first and second electrical contacts in step 510.

The method of FIG. 5 may additionally or alternatively include various steps and/or sub-steps as illustrated by step 512. For example, the deposition of the electrical insulator conformally over the first top electrical contact can include depositing the electrical insulator conformally over a surface and an edge of the first top electrical insulator, where the edge disposed between the first and second read transducers. Additionally or alternatively, deposition of the second top electrical contact over the electrical insulator can include depositing the second top electrical contact conformally over the electrical insulator. Additionally, at least one bottom electrical contact including first and second separately addressable bottom electrical contacts can be formed.

In alternative embodiments, the electrical contacts can be formed over the first and second coplanar read transducers. Each read transducer can comprise an air bearing surface (ABS), a first surface adjoining the ABS along the cross track direction, and a second surface adjoining the ABS along the cross track direction in some embodiments. The separately addressable electrical contacts can be formed to be respectively disposed along at least one of the first and second surfaces of the first and second read transducers in some embodiments.

The present disclosure to a magnetic read head with multiple read transducers. Multiple read transducers disposed on the same physical plane are described. These read transducers are in a coplanar cross track arrangement at a sufficient distance (e.g., two or more track widths apart in a cross track direction) from one another to minimize skew effects and reduce fabrication costs. Such an arrangement disposes the shield edge and gap away from the edges of the read transducers and allows for a greater degree of misalignment.

Embodiments disclosed herein additionally involve a magnetic read head with at least two separately addressable read transducers that are coplanar in a cross track direction. The read transducers have a cross track width, $w_r$, and a center-to-center separation distance between the two read transducers greater than $3w_r$ in the cross track direction.

Figure 6:
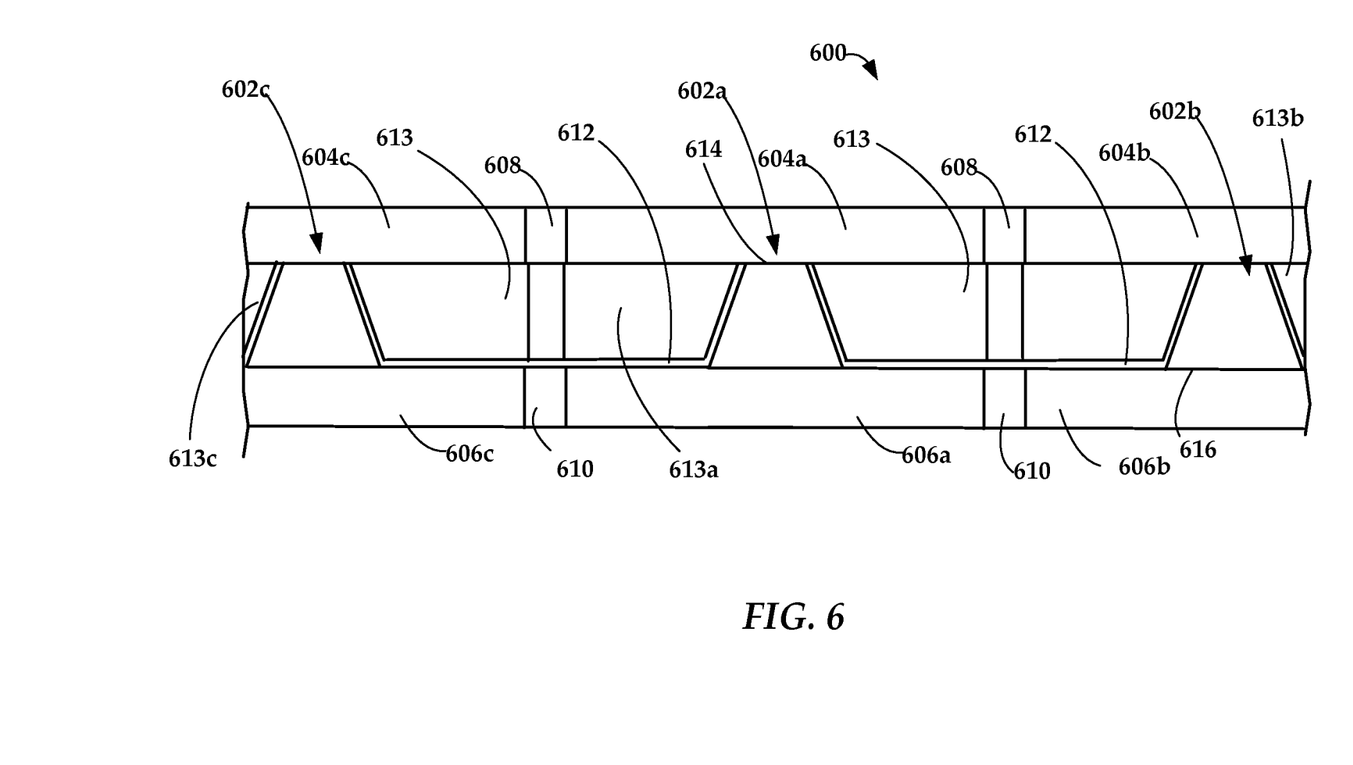
FIG. 6 is a perspective view of another embodiment of magnetic read head and shields/electrical contacts.

FIG. 6 shows another embodiment of magnetic read head 600 along several surfaces that interface with the ABS. Similar to FIG. 1A, FIG. 6 shows the first and second read transducers 602a and 602b, the first and second top contacts 604a and 604b, the first and second bottom contacts 606a and 606b, the insulating materials 608 and 610, the magnetic stabilization elements 613, 613a and 613b, the first surfaces 614 and the second surfaces 616 but additionally illustrates a third read transducer 602c, third top contact 604c, third bottom contact 606c, additional insulating materials 608 and 610, and additional stabilization elements 613 and 613c.

Related assemblies, methods, systems, articles, components, and techniques are also discussed.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A read head, comprising: separately addressable transducers, all of the separately addressable transducers are disposed on the same physical plane and coplanar in a cross track direction, and all of the separately addressable transducers having a cross track width, $w_r$, and a center-to-center separation distance between immediately adjacent transducers greater than or equal to about $3w_r$, in the cross track direction.

2. The read head of claim 1, wherein the transducers are configured for operation with a magnetic medium and the separation distance between the immediately adjacent transducers is at least two track widths of the magnetic medium.

3. The read head of claim 1, wherein the separation distance is greater than about 100 nm.

4. The read head of claim 1, wherein each transducer has an air bearing surface (ABS) and a first surface adjoining the ABS along the cross track direction, and further comprising electrical contacts disposed respectively along first surfaces of the transducers and the electrical contacts are coplanar and electrically isolated from one another.

5. The read head of claim 4, wherein each transducer has a second surface adjoining the ABS along the cross track direction, and further comprising electrical contacts disposed respectively along second surfaces of the transducers and the electrical contacts are coplanar and electrically isolated from one another.

6. The read head of claim 5, wherein a shield-to-shield spacing between the electrical contacts disposed along the first surfaces of the transducers and the electrical contacts disposed along the second surfaces of the transducers is less than about 25 nm.

7. The read head of claim 5, wherein an electrically insulating material is disposed between the electrical contacts, and wherein the electrically insulating material comprises at least one of alumina and silicon dioxide.

8. The read head of claim 4, wherein each read transducer has a second surface adjoining the ABS along the cross track direction, and further comprising an electrically continuous electrical contact disposed along second surfaces of each of the transducers.

9. The read head of claim 1, further comprising at least two magnetic stabilization elements that are coplanar with the transducers.

10. The read head of claim 9, wherein the at least two magnetic stabilization elements have a width along the cross track direction greater than about 25 nm and comprise one of permanent magnets and magnetic shields.

11. The read head of claim 1, wherein the read head comprises at least three of the separately addressable transducers, each of the three transducers having a cross track width, $w_r$, and a center-to-center separation distance between an immediately adjacent one of the transducers greater than or equal to about $3w_r$, in the cross track direction.

12. The read head of claim 1, wherein a first transducer and a second transducer of the separately addressable transducers are configured to each be selectively activatable such that the first transducer can be active at a time when the second transducer would be inactive.

13. A system, comprising:
a magnetic medium having data tracks, each data track having a width, $w_t$; and a magnetic read head comprising separately addressable read transducers, all of the separately addressable read transducers are disposed on the same physical plane and coplanar in a cross track direction, and all of the separately addressable read transducers having a center-to-center separation distance between immediately adjacent read transducers of at least $2w_t$.

14. The system of claim 13, wherein the width $w_t$ is configured such that an integer number of data tracks exist in the center-to-center separation distance between the immediately adjacent read transducers.

15. The system of claim 13, wherein:
the magnetic medium is a continuous magnetic medium disk;
the center-to-center spacing between the data tracks is a non-integer multiple of the separation distance; and
the magnetic medium disk includes one or more non-data tracks, each non-data track disposed between bands of data tracks.

16. The system of claim 15, wherein each non-data track has a width less than $w_t$.

17. The system of claim 13, wherein the read transducers have a cross track width, $w_r$, and the separation distance is greater than about $3w_r$.

18. The system of claim 13, wherein the separation distance is at least one of greater than about 100 nm and at least $25w_t$.

19. The system of claim 13, wherein each read transducer has an air bearing surface (ABS) and a first surface adjoining the ABS along the cross track direction, and further comprising electrical contacts respectively disposed along first surfaces of the read transducers, the electrical contacts electrically isolated from one another and each comprising a combined contact configured to provide electrical connectivity and magnetic shielding.

* * * * *